United States Patent Office 2,937,950
Patented May 24, 1960

2,937,950

THIXOTROPIC TREATING COMPOSITION AND A METHOD OF TREATING CONCRETE POURING FORMS THEREWITH

Richard M. Tillman, Ponca City, Okla., assignor to Continental Oil Company, Ponca City, Okla., a corporation of Delaware No Drawing. Filed Oct. 14, 1954, Ser. No. 462,395

9 Claims. (Cl. 106—38.24)

This invention relates to a composition useful as a cement curing agent and as a slushing compound in the treatment of concrete forms designed for repeated re-use such as forms utilized in lining tunnels, aqueducts, and the like or other construction where re-use of forms is practiced.

Wooden and metal forms have long been used to hold concrete in proper position until the characteristic hardening has occurred. When cement is poured into forms, considerable trouble due to the sticking of solidified cement to the forms is often encountered, particularly when rough lumber is used. In addition, water is absorbed from the concrete into the form lumber, leading to weakened concrete. It has been the usual practice to coat such forms with mineral oils of various viscosities such as crankcase drainings, some forms of water-in-oil emulsions, and other similar products immiscible with water. Such materials are, however, effective only when present in thick films. They have no thixotropic properties and tend to drain off vertical surfaces. The difficulties are especially pronounced in large outdoor construction projects when very high vertical form walls are used and exposed to heat. In such cases, any protective coating heretofore known proved to be unsatisfactory for the upper parts of these vertical form walls. The forms are easily removed from the lower parts of the concrete cast but cannot be removed from the upper parts without breaking. This was due, of course, to the thinning of the concrete form slushing compound in flowing down the form. If thick semi-solid greases are used, application cannot be made by spraying or simple brushing, consequently coating a form with such a composition is expensive. This thinning of the surface coating in most cases allows some concrete to adhere to the board when the form is removed even on its first use. The adhering concrete is generally in an amount sufficient to make cleaning and recoating with oil difficult and expensive.

Water must be retained in new concrete for a sufficient length of time to permit the concrete to cure. Curing means retention of the mixing water until hydration, or the chemical reaction of the cement, sand and water, is completed. After concrete is placed and finished by troweling, screeding, or belting, evaporation of the mixing water must be prevented until hydration of the cement is completed. This is universally recognized as essential to the production of durable concrete. Various methods have been used to retain water in newly laid concrete for a sufficient period to effect curing. One method is that of surrounding the new concrete with embankments which confine quantities of water poured over the concrete. This method is known as ponding, and is impractical for long stretches of roadway and shorter stretches on grades, as well as being very expensive. In another method, as soon as the concrete can sustain considerable weight, the surface is covered with several inches of earth which has to be kept continuously wet and which later on has to be removed before the road can be opened to traffic. Obviously such a method is not satisfactory. In a further method, which is also unsatisfactory, a thickness of hay is spread upon the concrete surface, which must be kept wet and after the concrete has cured the hay must be cleared away.

It is, therefore, a principal object of the present invention to provide a composition which obviates the disadvantages of the prior art compositions. It is another object of my invention to provide a composition having thixotropic properties for the treatment of concrete forms achieving freedom from adherence, smoothness of finished concrete, and the preservation of the forms under adverse conditions to a degree not heretofore readily possible. Yet another object of this invention is to provide a coating composition for concrete which aids in the cure of the concrete. These and other objects and advantages will become apparent as the invention is more thoroughly described.

The foregoing objects are attained by a process which in brief may be described as follows: The concrete contacting surfaces are coated with a composition which comprises a mixture of petrolatum and a petroleum distillate as a solvent containing a small amount of water and a water-insoluble soap dispersed therein in the relative proportions of 10 to 40 percent, 50 to 89.8 percent, and 0.1–5 percent, and 0.1–5 percent respectively. Such formulations are thixotropic in nature. While they may be readily sprayed, they form thick films on vertical walls which draw slowly if at all. Suitable solvents include light cycle oil, synthetic tower bottoms, heavy re-cycle oil, 170 furfural extract, 50–50 mixture of dodecylbenzene intermediate and polydodecylbenzene overhead; however, heavy cycle oil is preferred because it is both cheap and available in large quantities.

As used herein and in the appended claims a cycle oil is that product obtained as a side stream from a cat cracking fractionator. A light cycle oil has a boiling range of 390 to 528° F. and contains 55 to 63 percent aromatics. A heavy cycle oil has a boiling range of 415 to 650° F. and contains 20 to 30 percent aromatics. A 170 furfural extract is derived from a feed stock for producing 170 S.S.U. at 100° F. pale oil. This particular extract is a mixture of naphthenes and aromatics. Bright stock petrolatum, 95 to 120 S.S.U. at 210° F., is a waxy product produced from the hexane dewaxing process producing bright stock. Cit-Con petrolatum is a waxy product obtained in the methyl ethyl ketone dewaxing process of petroleum. The synthetic tower bottoms used in Example 8 are available commercially. This particular product has a boiling range of 260 to about 400° C. and is a highly refractory petroleum fraction consisting of the bottoms from the distillation of the product resulting from the moving bed catalytic cracking of petroleum oils. Typical physical properties of this product are as follows:

| | |
|---|---:|
| Refractive index at 25° C. | 1.574 |
| Average molecular weight | 210 |
| A.P.I. gravity | 15.1 |
| Aniline number °F | 73.4 |
| Percent hydrogen | 10.69–10.75 |
| Percent carbon | 88.88–89.37 |
| Hydrogen carbon ratio | 1.44 |
| Percent non-aromatics | 27.8 |
| Percent aromatics | 72.2 |
| Average molecular weight of non-aromatics | 245 |
| Average molecular weight of aromatics | 204 |

All molecular weights were determined by the cryoscopic method. Specific compounds that occur in these distillation bottoms are believed to include the following: pentamethyl benzene, methylated naphthalenes, methylated anthacenes, phenanthrene, methylated phenanthrenes, acenaphthene, and methylated acenaphthenes.

Dodecylbenzene intermediate consists of about 63% aromatics and 27% non-aromatics and its typical physical properties are as follows:

Specific gravity at 60° F___ 0.815–0.825.
Average molecular weight__ 160.
A.S.T.M. D-158 Engler:
    I.B.P. _____ 325° F. min.
    50% _____ 371° F.
    F.B.P. _____ 470° F. max.
Refractive index at 55° C__ 1.4550.
Aniline point _____ 95° C.
Bromine number _____ 0.27.
Flash point (closed cup) __ 129.5° F.

Typical physical properties of the polydodecylbenzene overhead used were as follows:

Specific gravity at 100° F__ 0.860–0.870.
Average molecular weight__ 300.
Viscosity at 100° F_____ 110 S.S.U.
A.S.T.M. D-158 Engler:
    I.B.P. _____ 590° F. min.
    50% _____ 656° F.
    F.B.P. _____ 750° F.
Bromine number _____ 0.40.
Flash point (open cup) ___ 335° F.

In order to disclose the nature of the present invention still more clearly the following illustrative examples will be given in which parts are by weight.

EXAMPLE 1

| | Parts |
|---|---|
| 170 furfural extract | 45 |
| Petrolatum (bright stock) | 15 |
| Aluminum distearate | 1 |
| Water | 1 |

EXAMPLE 2

| | |
|---|---|
| Heavy cycle oil | 45 |
| Petrolatum (bright stock) | 15 |
| Aluminum distearate | 0.65 |
| Water | 1 |

EXAMPLE 3

| | |
|---|---|
| Heavy cycle oil | 45 |
| Petrolatum (bright stock) | 15 |
| Aluminum distearate | 1.3 |
| Water | 1 |

EXAMPLE 4

| | |
|---|---|
| 170 furfural extract | 45 |
| Petrolatum (bright stock) | 15 |
| Wash naphtha | 20 |
| Aluminum distearate | 1.8 |
| Water | 1 |

EXAMPLE 5

| | |
|---|---|
| Heavy cycle oil | 45 |
| Petrolatum (bright stock) | 15 |
| Aluminum distearate | 0.1 |
| Water | 1 |

EXAMPLE 6

| | |
|---|---|
| Heavy cycle oil | 45 |
| Petrolatum (bright stock) | 15 |
| Aluminum distearate | 0.5 |
| Water | 1 |

EXAMPLE 7

| | |
|---|---|
| Light cycle oil | 45 |
| Petrolatum (bright stock) | 15 |
| Aluminum distearate | 1 |
| Water | 1 |

EXAMPLE 8

| | Parts |
|---|---|
| Synthetic tower bottoms | 45 |
| Petrolatum (bright stock) | 15 |
| Aluminum distearate | 1 |
| Water | 1 |

EXAMPLE 9

| | |
|---|---|
| Heavy cycle oil | 71.8 |
| Petrolatum (bright stock) | 24.6 |
| Aluminum distearate | 2.0 |
| Water | 1.6 |

Example 2 was repeated using other polyvalent metal soaps in place of aluminum distearate. Specific soaps used were zinc palmitate, cobalt naphthenate, lead stearate, ferric stearate, cupric stearate, zinc stearate, calcium stearate, barium stearate, magnesium stearate, and manganese stearate. In these examples 0.65 part of the specific soap was substituted for the 0.65 part of aluminum distearate used in Example 2.

Following the preparation of the compositions in accordance to the above-mentioned examples, their lubricating properties were determined by the use of the wood break-away type forms wherein the wood form was coated with the lubricating composition. In making these tests, sections of the forms were examined and photographed after each pour. Lack of concrete adhering to the form and lack of sticking were taken as a measure of the efficiency of the composition as a lubricant. The concrete used in these tests was a dry mix of sand and cement used in the weight ratio of 4 parts dry mix to 0.7 part of water. For comparison purposes a mineral oil treated form and an untreated form were subjected to the same test. The results are summarized in Table I.

*Table I*

| Lubricating Agent | Number of pourings obtainable without sticking |
|---|---|
| Control (untreated form) | 1 |
| Mineral Oil | 2 |
| Composition of Example No. 1 | 5 |
| Composition of Example No. 2 | 5 |
| Composition of Example No. 3 | 5 |
| Composition of Example No. 4 | 4 |
| Composition of Example No. 5 | 5 |
| Composition of Example No. 6 | 5 |
| Composition of Example No. 7 | 5 |
| Composition of Example No. 8 | 4 |
| Composition of Example No. 9 | 5 |

The curing properties of the various compositions prepared in accordance to the foregoing examples were determined using the method described in ASTM Designation C156–52T wherein water loss is taken as a measure of the curing properties. Typical results are summarized in Table II.

*Table II*

| Curing Agent | Percent Water Loss (ASTM C156–52T) |
|---|---|
| Control (no curing agent present) | 2.34 |
| Composition of Example No. 2 | 0.69 |
| Composition of Example No. 9 | 0.80 |
| Composition of Example No. 2 without the aluminum distearate | 1.67 |

All of the compositions prepared according to the foregoing examples gave excellent results, both in respect to lubricating and curing properties. A number of compositions, however, were objectionable for other reasons. Objectional features of the various compositions were as follows: furfural extract without diluting with naphtha was too viscous. The use of naphtha, however, lowers the flash point of the resulting solution which constitutes a safety hazard. Compositions containing synthetic tower bottoms caused dark stains on the concrete.

It was noted that the compositions were effective as curing agents only when the water insoluble soap was dispersed in the solvent-petrolatum mixture. If the soap was dissolved by strong heating during blending, the composition exhibited no curing properties. Only those soaps were effective where electron micrograph studies indicate that the soap was present as a dispersed and gelatinous state.

It is apparent that many modifications and variations of the invention as hereinbefore set forth may be made without departing from the spirit and scope thereof. The examples given are by way of illustration only and the invention is limited only by the terms of the appended claims.

I claim:

1. A method of treating concrete pouring forms whereby said concrete is not weakened by loss of moisture to said forms and whereby the concrete will not stick to said forms which consists in applying to said forms a thixotropic composition consisting essentially of 0.1 to 5 percent of a water insoluble soap, about 1.2 to 5 percent water, 10 to 40 percent petrolatum, and 50 to 88.7 percent of a petroleum distillate, wherein the relative quantities are on a weight basis, said method being characterized further in that said soap and water of said composition are dispersed in said petroleum distillate and petrolatum.

2. A method of treating concrete pouring forms whereby said concrete is not weakened by loss of moisture to said forms and whereby the concrete will not stick to said forms which consists in applying to said forms a thixotropic composition consisting essentially of 0.1 to 5 percent of a water insoluble soap, about 1.2 to 1.6 percent water, 10 to 40 percent petrolatum, and 50 to 88.7 percent of a petroleum distillate, wherein the relative quantities are on a weight basis, said method being characterized further in that said soap and water of said composition are dispersed in said petroleum distillate and petrolatum.

3. The method of claim 2 wherein the petroleum distillate is light cycle oil and the water insoluble soap is aluminum distearate.

4. A thixotropic composition being especially adapted for treating concrete pouring forms consisting essentially of 0.1 to 5 percent of a water insoluble soap, about 1.2 to 5 percent water, 10 to 40 percent petrolatum, and 50 to 88.7 percent of a petroleum distillate wherein the relative quantities are on a weight basis, said composition being characterized further in that said soap and water are dispersed in said petroleum distillate and petrolatum.

5. A thixotropic composition being especially adapted for treating concrete pouring forms consisting essentially of 0.1 to 5 percent of a water insoluble soap, about 1.2 to 1.6 percent water, 10 to 40 percent petrolatum, and 50 to 88.7 percent of a petroleum distillate wherein the relative quantities are on a weight basis, said composition being characterized further in that said soap and water are dispersed in said petroleum distillate and petrolatum.

6. A composition according to claim 5 wherein the petroleum distillate is heavy cycle oil and the water insoluble soap is aluminum soap.

7. An article comprising a cement pouring form having deposited thereon a composition consisting essentially of 0.1 to 5 percent of a water insoluble soap, about 1.2 to 5 percent water, 10 to 40 percent petrolatum, and 50 to 88.7 percent of a petroleum distillate wherein the relative quantities are on a weight basis, the composition being characterized further in that said soap and water are dispersed in the petroleum distillate and petrolatum.

8. An article according to claim 7 wherein the percent water in the composition is about 1.2 to 1.6 percent.

9. An article according to claim 8 wherein the petroleum distillate and soap in the composition are light cycle oil and aluminum distearate, respectively.

References Cited in the file of this patent

UNITED STATES PATENTS

| | | |
|---|---|---|
| 2,143,515 | Hayden | Jan. 10, 1939 |
| 2,287,270 | Partridge | June 23, 1942 |
| 2,293,410 | Sorem | Aug. 18, 1942 |
| 2,316,752 | Atkinson | Apr. 20, 1943 |
| 2,469,041 | Jones | May 3, 1949 |
| 2,614,049 | Swanson | Oct. 14, 1952 |